United States Patent [19]
Saito et al.

[11] Patent Number: 5,349,407
[45] Date of Patent: Sep. 20, 1994

[54] FILM TRANSPORTING SYSTEM INCLUDING A COUNTER AND A FILM EXISTENCE DETECTOR FOR A PHOTOGRAPHIC CAMERA

[75] Inventors: Tatsuo Saito; Haruo Onozuka; Yasuhiko Tanaka, all of Ohmiya, Japan

[73] Assignee: Fuji Photo Optical Co., Ltd., Ohmiya, Japan

[21] Appl. No.: 71,706

[22] Filed: Jun. 4, 1993

[30] Foreign Application Priority Data

Jun. 5, 1992 [JP] Japan .................. 4-171966

[51] Int. Cl.$^5$ .................. G03B 1/18; G03B 17/36
[52] U.S. Cl. .................. 354/173.1; 354/214; 354/217
[58] Field of Search .................. 354/21, 173.1, 173.11, 354/212, 213, 214, 217

[56] References Cited

U.S. PATENT DOCUMENTS 4,561,741 12/1985 Ishizaka et al. .................. 354/21
5,028,944 7/1991 Kobayashi et al. .................. 354/173.1
5,032,854 7/1991 Smart et al. .................. 354/21

Primary Examiner—Michael L. Gellner
Assistant Examiner—J. K. Han
Attorney, Agent, or Firm—Price, Heneveld, Cooper, DeWitt & Litton

[57] ABSTRACT

A film transporter is coupled to a counter which counts the number of used film frames. A film detector detects a film when the count signal is "0," i.e., a state where the counter for counting the number of used film frames is reset. When it is detected that the camera has no film roll loaded therein, the film transporter is disabled to advance or rewind the film roll. There is provided a film travel detector adapted to stop further travel of the film roll after the number of pulses output every time the film roll travels by one frame has reached a predetermined number and, when the camera has the film roll loaded therein, the predetermined number is changed depending whether the count signal is "0," so that a common control system effects initial film advance and advance of each frame following the initial film advance.

11 Claims, 4 Drawing Sheets

FILM TRANSPORTING SYSTEM INCLUDING A COUNTER AND A FILM EXISTENCE DETECTOR FOR A PHOTOGRAPHIC CAMERA

BACKGROUND OF THE INVENTION

1. Technical Field

This invention relates to a film transporting system adapted to ascertain that a photographic camera has a film roll loaded therein before the system transports the film roll.

2. Prior Art

Photographic cameras of various types requiring neither skill nor experience of users have become very popular. With these handy prior art cameras, upon closure of the rear cover after a film cartridge has been loaded into the camera, the built-in electric motor is actuated to transport the film roll by a sufficient amount to bring the camera to a state ready for photographing. Immediately after the first release, the motor is actuated again to advance the film roll by one frame and thereby to align the next frame with the aperture. Use of the final frame causes the motor to rewind the film roll into the cartridge.

If the motor is actuated upon depression of the release button for a predetermined period, even though the camera has no film roll loaded therein, the source battery will be rapidly consumed. To solve this problem, it is well known to provide the camera, including the film transporting system adapted to selectively advance and rewind the film roll, with a film existence detector.

In such prior art arrangements, as will be apparent from FIG. 4 of the accompanying drawings, a motor drive signal is applied from central processing unit (CPU) 1 provided in the camera to the film transporter 2 which comprises a motor drive circuit 2a and an electric motor 2b driven by said motor drive circuit 2a. Said CPU 1 is electrically connected to a film travel detector means 3 so that film travel signals are exchanged between said CPU 1 and said film travel detector means 3, which represent an initial advance of the film roll occurring immediately after the film roll has been loaded into the camera; advance of each frame; and rewinding of the film roll taking place immediately after the final frame has been used. A detection signal is applied from a film existence detector 4 to said CPU 1 utilizing DX codes or the like to detect whether the camera has the film roll loaded therein. There is further provided counter 5 adapted to count the number of used frames so that a count signal representing the number of used frames is exchanged between the counter 5 and the CPU 1.

The motor drive signal is applied from the CPU 1 to the film transporter 2 only when the signal representing the existence of the film roll is applied from the film existence detector 4 to the CPU 1.

However, such film transporting system of the prior art has been disadvantageous in that, if the film existence detector 4 erroneously provides the signal indicating the absence of the film roll, due to any failure, the film transporter 2 will not be actuated and the film roll cannot be advanced, although the camera really has the film roll loaded therein. Once the film transporter 2 has been disabled, the operation of film rewinding will be impossible and the camera itself will be disabled. In addition, the user will mistakenly believe that the camera contains no film roll and open the rear cover, resulting in exposure of used film.

SUMMARY OF THE INVENTION

Accordingly, it is a principal object of the invention to provide a film transporting system for a photographic camera including a film transporter selectively functioning to advance or rewind a film roll when the camera has the film roll loaded therein, but remaining disabled when the camera has no film roll loaded therein, so loner as there is no failure in the film transporter.

The object set forth above is achieved, according to the invention, by a film transporting system for a photographic camera including a film transporter selectively functioning to advance or rewind a film roll loaded in the camera. A counter is used to count the number of consumed film frames. A film existence detector is responsive to a count signal applied thereto from the counter to detect whether or not the camera has a film roll loaded therein. The film existence detector detects the existence of the film roll only when the count signal output from the counter means is "0" and does not actuate the film transporter when the camera has no film roll loaded therein. It should be understood that the count signal of "0" corresponds to a state in which the film roll has already been rewound and the counter for the number of used film frames has been reset.

To simplify a drive mechanism for film transport, the film transporting system preferably comprises a film transporter selectively functioning to advance or rewind a film roll loaded in the camera. A counter is used to count the number of used film frames. A film existence detector is responsive to a count signal applied thereto from the counter to detect whether or not the camera has a film roll loaded therein only when the count signal is "0." A film travel detector selectively controls film advance or film rewinding by detecting a film travel pulse output every time the film roll travels by a predetermined length and applies a film stopping signal to said film transporter when the number of said travel pulses has reached a predetermined number. The film transporter is not actuated when: the film existence detector detects that the camera has no film roll loaded therein; and wherein the predetermined number associated with the film travel detector depends on whether said count signal is "0," when it has been determined that the camera has the film roll loaded therein. It should be understood here that the travel pulse is output as a perforation passes by a given location on the camera.

In order that the film roll can be reliably rewound, the film travel detector preferably detects, within a predetermined period after the film roll has started to travel, whether or not the number of film travel pulses has reached the predetermined number.

Preferably, operation of the counter for counting the number of used film frames is started by closure of a rear cover or depression of a release button.

To simplify a control system for the film transport, the film transporting system preferably comprises a film transporter selectively functioning to advance or rewind a film roll loaded in the camera. A counter is used to count the number of used film frames. The film existence detector is responsive to a count signal applied thereto from said counter to detect whether or not the camera has a film roll loaded therein. A control system for operation of the film transporter serves commonly for initial advance of film and for advance of each film frame following said initial advance.

With no film roll loaded in the camera, the counter for the number of used frames outputs the count signal "0." Even if the release button is depressed in this state, the film transporter is not actuated and the counter is not counted up, since the film existence detector is responsive to the count signal "0" to detect that the camera contains no film roll.

Immediately after the film roll has been loaded, the counter still outputs the count signal "0," but now the film existence detector means is responsive to this count signal "0" to detect the existence of the film roll and actuates the film transporter to make an initial advance of the film roll. Correspondingly, the counter is incremental and outputs the count signal "1."

Once the counter has been incremented so as to output a count signal other than "0," which represents the existence of the film roll, the film transporter is actuated selectively to advance or rewind the film roll.

The length of each film travel is changed as the number of travel pulses predetermined in association with said film travel detector is changed. The number of film travels may be adjusted to a length including a length of the film leader for the initial film advance and to the length of each frame for the single frame advance. In this manner, the same film transporter can be commonly used for the initial film advance and the single frame advance by appropriately changing the number of film travels.

DETAILED DESCRIPTION OF THE PREFERRED EMBODIMENT

The film transporting system of the invention will now be described with reference to the accompanying drawings.

Figure 1:
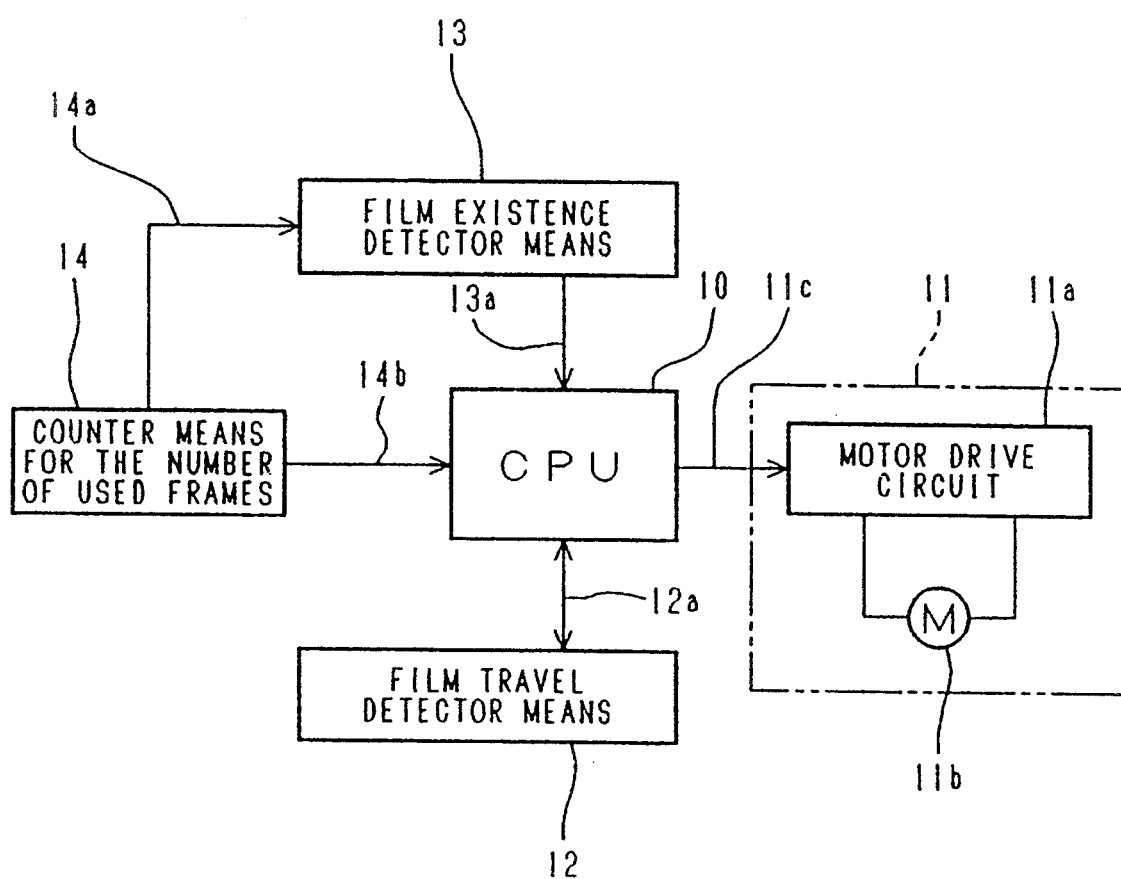
FIG. 1 is a schematic block diagram showing the film transporting system constructed according to the invention.

FIG. 1 is a schematic block diagram of the film transporting system and, as shown, the system is constructed around CPU 10 built in the camera. A film roll loaded in the camera is advanced or rewound by a film transporter 11 including a motor drive circuit 11a and an electric motor 11b. A motor drive signal output from CPU 10 is applied via a film transport data line 11c to the film transporter 11 and, after the film roll has traveled by an amount predetermined for the initial advance or the single frame advance, the CPU 10 outputs a motor stop signal with which the film transporting means 11 is stopped. Film travel detector 12 detects whether the film roll has been transported by a predetermined amount or not, and the film travel detector 12 applies a film travel signal to the CPU 10 via a film travel data line 12a.

Film existence detector 13, using DX cedes carried on a film cartridge or the like, detects whether the camera contains a film roll and applies a film existence detection signal to the CPU 10 via a film existence detection data line 13a. A count signal output from counter 14 for the number of used frames is applied to the film existence detector 13 via a count data line 14a. The film existence detector 13 is adapted to detect whether the camera has a film roll loaded therein only when the count signal "0" is output from the counter 14 for the number of used frames. The counter 14 applies the count signal to the CPU 10 via a used frame number data line 14b. Data such as the number of used frames corresponding to the count signal allied from the CPU 10 is displayed on a liquid crystal display, or the like, provided externally of the camera so that the user may visually recognize this data.

Figure 2:
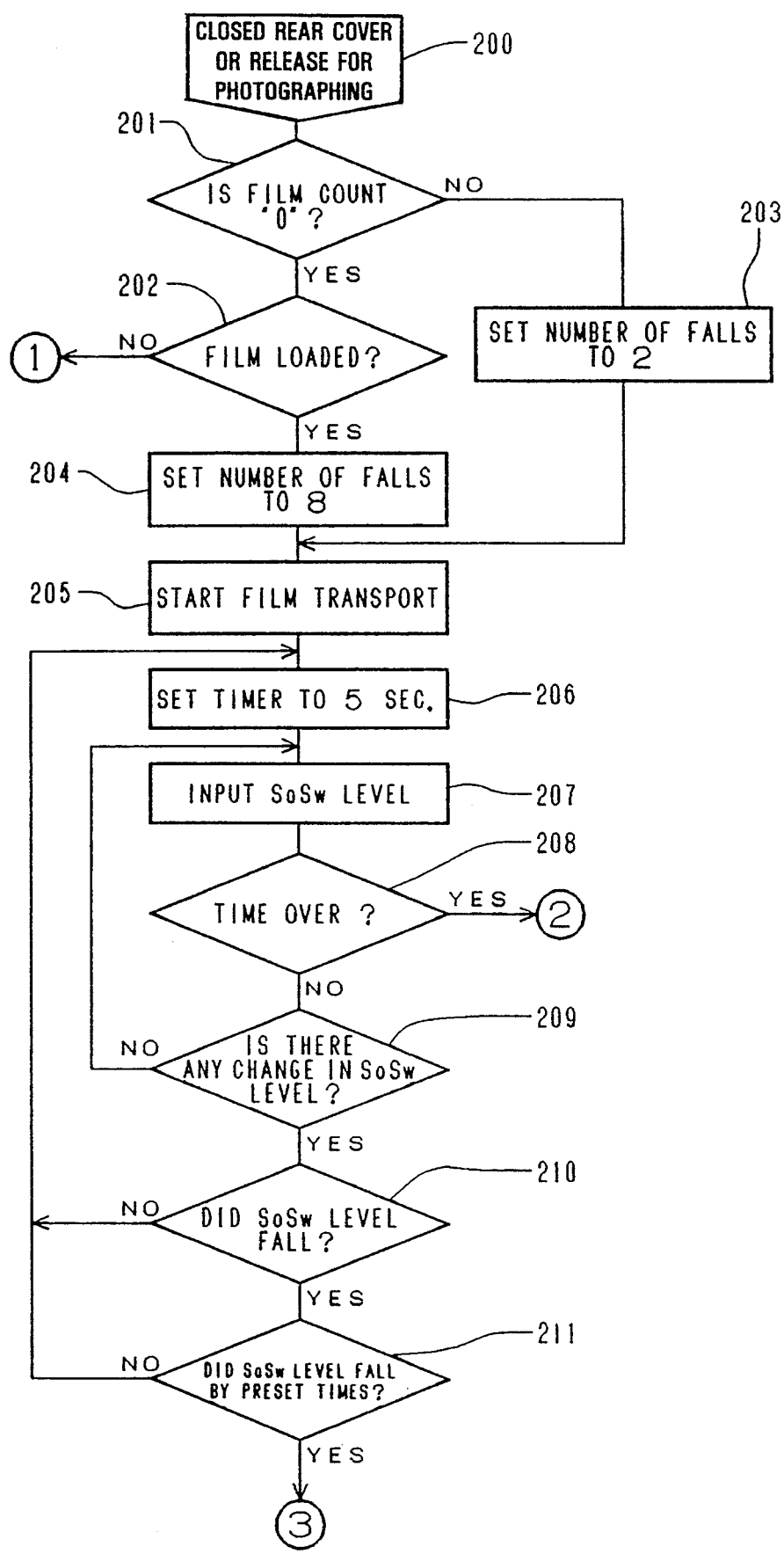
FIG. 2 is a flow chart illustrating a routine for film transporting according to FIG. 1.

Operation of the film transporting system constructed according to the invention as described above will now be described with reference to the flow charts illustrated by FIGS. 2 and 3.

Upon closure of the rear cover after a film roll has been loaded into the camera, or upon completion of a release for photographing, the routine proceeds from step 200 to step 201 to determine, based on the count signal applied from the counter 14, whether the frame count is "0" or not. If the frame count has been determined to be "0," the routine proceeds to step 202 on which the film existence detector 13 detects whether the camera has a film roll loaded therein. If NO, subsequent processing will not be run and a strobe control (step 303) or the like will be run. If said step 201 has determined that the film count is not "0," i.e., that the camera contains a film roll and some frames thereof have already been consumed, the routine proceeds to step 203 in which a frequency of repeated falls is set to "2" and then proceeds to step 205. If said step 202 has determined that the camera contains a film roll, the routine proceeds to step 204 in which the frequency of respected falls is set to "8" and then proceeds to step 205. The frequency of repeated falls corresponds to an amount of the film roll to be advanced. More specifically, an amount of the single frame advance corresponds to the frequency "2" and, if said step 201 detects the film count "0" and said step 202 ascertains that the camera has a film roll loaded therein, the frequency of repeated falls is set to "8" which corresponds to an amount of the initial film advance.

In said step 205, the film transporter 11 is actuated to start film transport, whereupon a timer is set to five seconds in association with said film travel detector 12 (step 206). Then, instantaneous level "H" or "L" of a single frame switch (SoSw) is input (step 207). Step 208 determines whether the timer set to five seconds in said step 206 has exceeded the preset time or not and, if NO, the routine proceeds to step 209 to determine whether the preset level of SoSw has changed or not. If NO, the routine returns to step 207 to input the SoSw again. Then, determination of steps 208 and 209 will be repeated. If step 209 determines that the SoSw level has changed, the routine proceeds to step 210 to determine whether such change is due to falls or not. Specifically, if "H" was input as the SoSw level on step 207 and this level has changed to "L," it is detected that the film travel pulse has been output. Now the routine proceeds to step 211 to determine whether or not the falls have been repeated with a frequency corresponding to the frequency of repeated falls preset on said step 203 or 204. If the conclusion of step 210 or 211 is NO, the routine returns to step 206 to again set the time to five seconds, and steps 207 through 211 will be run.

Figure 3:
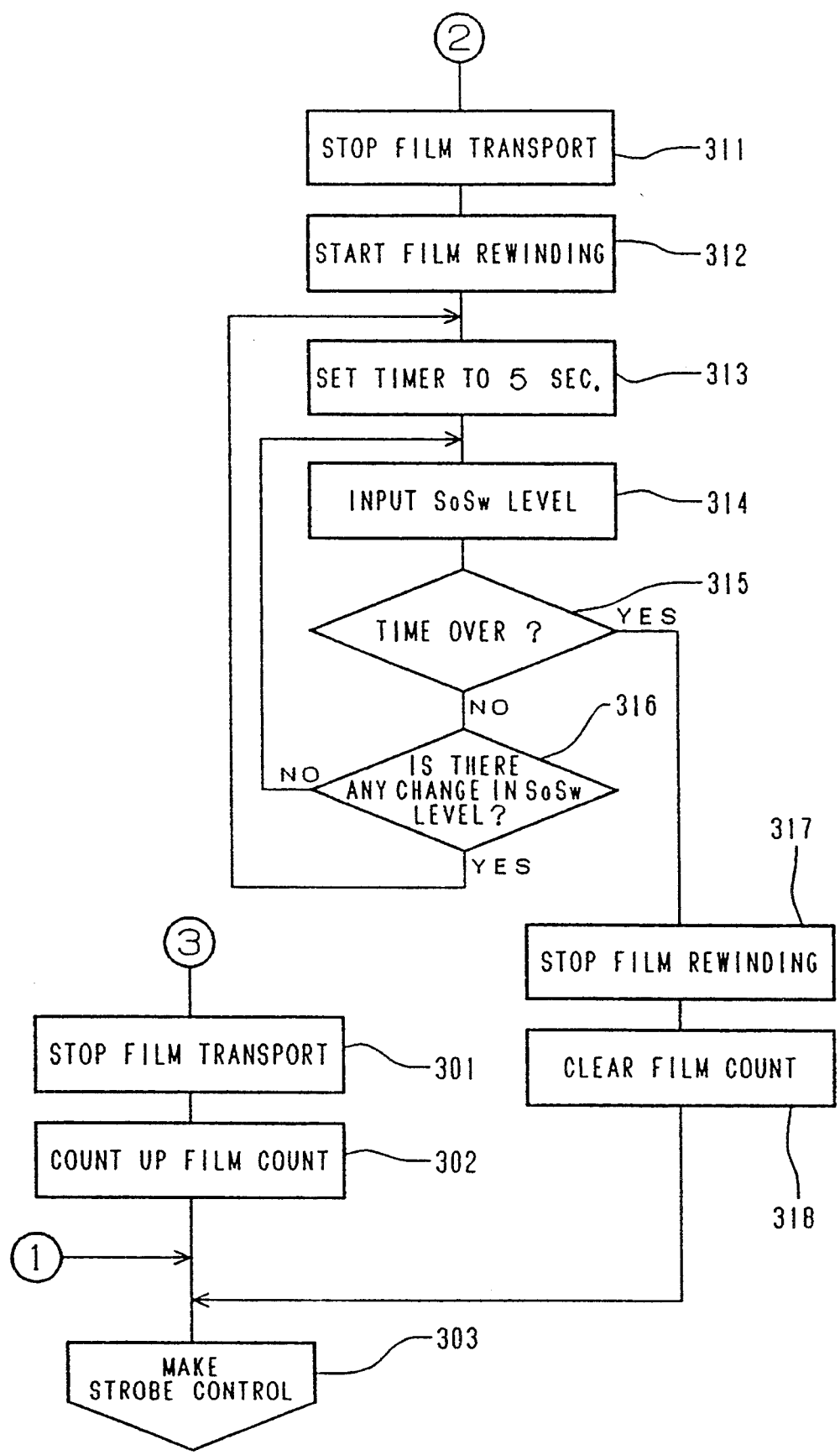
FIG. 3 is a flow chart illustrating a routine for film transporting.
Figure 4:
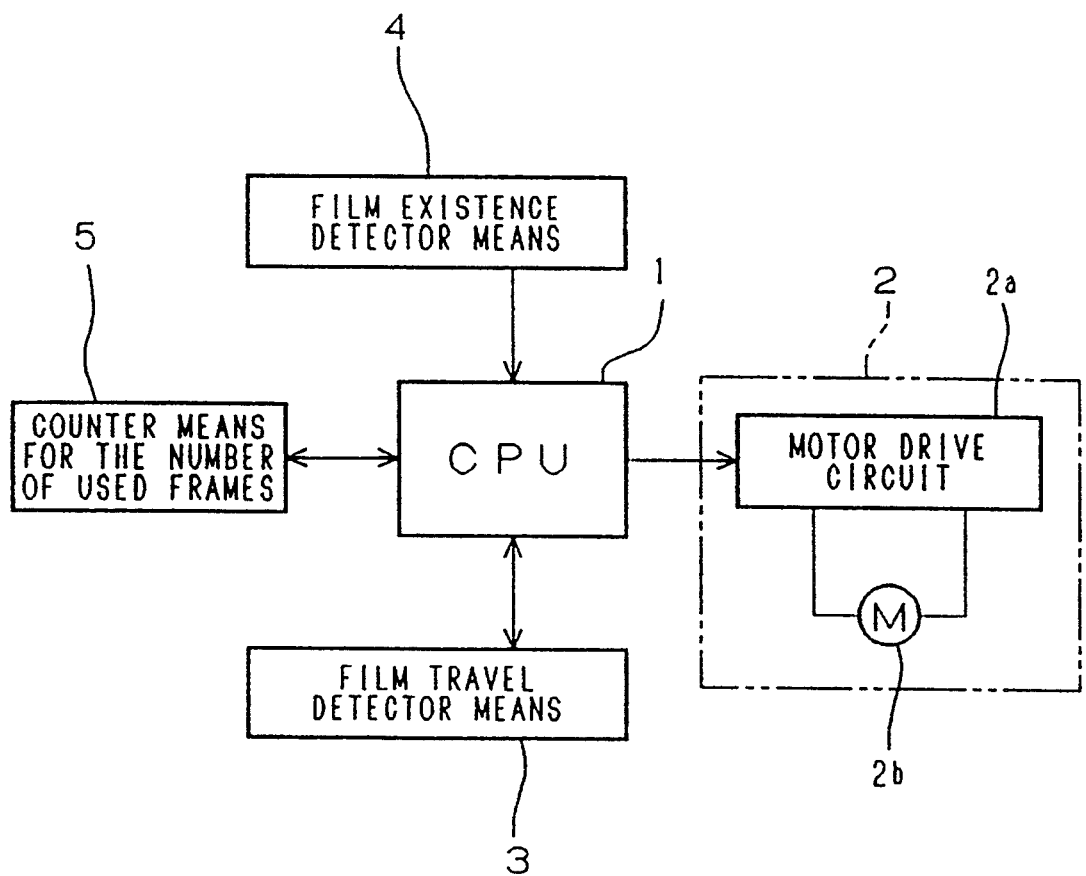
FIG. 4 is a schematic block diagram showing an example of a conventional film transporting system.

If the conclusion of step 211 is YES, the routine proceeds to step 301 in the flow chart of FIG. 3 to stop further operation of the film transporter 11 and thereby to stop the film transport, since said conclusion indicates that the film roll has been transported by a predetermined amount, i.e., a single frame has been advanced or the initial film advance has been completed. Accordingly, the counter 14 of the number of used frames counts up the number of used frames (step 302). The routine proceeds then to step 303 to run the strobe control in preparation for release for the next photograph.

Step 208 determines that the preset time has been exceeded when there occurs no change in the SoSw level, i.e., the film roll has been completely advanced and cannot be further advanced. In response to such state, the film roll will be rewound. The routine proceeds to step 311 to stop the film transport and step 312 reverses the electric motor 11b of the film transporter 11 to start the film rewinding.

The routine proceeds to step 313 to set the timer to five seconds in the same manner as step 206 did, and then proceeds to step 314 to input the SoSw level in the same manner as step 207 did. Step 315 determines whether the timer has exceeded the preset time or not and, if NO, the routine proceeds to step 316 to determine whether the SoSw level has changed. If a change in the SoSw level indicating that the film roll continues to be rewound is detected, the routine returns to said step 313 to set the timer to five seconds and steps 314 through 316 are repeated. If the conclusion of said step 316 is NO, the routine returns to step 314 and steps 315 and 316 will be repeated.

If step 315 determines that the timer has exceeded the preset time and it is indicated that the film roll has been completely rewound, step 317 stops operation of film roll rewinding, step 318 clears the film count causing the counter 14 of the number of used frames to output the count signal "0," and step 303 executes the strobe control in preparation for loading of a new film roll.

Effect of the Invention

As will be apparent from the foregoing description, the film transporting system of the invention is arranged so that the film existence detector functions only when the counter of the number of used frames outputs the count signal "0" and, if the film existence detector determines that the camera has no film roll loaded therein, the film transporter is not actuated. Accordingly, film existence detection is not performed so long as the camera has a film roll loaded therein and several frames thereof have been consumed. Consequently, even if a fault occurs in the film existence detector, the film transporter will not be affected thereby such that the transporter will properly function to advance or rewind the film roll.

Without a film roll loaded in the camera, the counter of the number of used frames outputs the count signal "0," in response to which the film existence detector detects the absence of the film roll. The film transporter will not be actuated, preventing the source battery from being consumed in vain.

Furthermore, merely by changing the amount of film travel occurring before the film transporter is stopped, depending on whether the count signal representing the number of used frames is "0" or other than "0," both the initial film advance and the single frame advance can be achieved by a common process, so the process required control of film advance and film rewinding can be effectively simplified.

The embodiment of the invention in which an exclusive property or privilege is claimed are defined as follows:

1. A film transporting system for photographing camera, film transporting system comprising:
   a film transporter selectively functioning to advance or rewind a film roll loaded in the camera;
   a counter mounted in the camera, said counter generating a count signal indicating the number of used film frames on the film roll loaded in the camera; and
   a film existence detector coupled to said counter, said film existence detector selectively detecting whether the camera has the film roll loaded therein responsive to said count signal applied from said counter
   a controller coupled to said film transporter and to said film existence detector, said controller controlling operation of said transporter, wherein said film existence detector only determines whether the film roll is loaded in the camera when said count signal output from said counter is "0" and said controller does not actuate said film transporter when said film existence detector indicates that the camera has no film roll loaded therein.

2. The film transporting system according to claim 1, wherein operation of said counter means for counting the number of used film frames is started by closure of a rear cover or depression of a release button.

3. A film transporting system for a photographic camera, the film transporting system comprising:
   a film transporter selectively functioning to advance or rewind a film roll loaded in the camera;
   a counter mounted in the camera to count the number of used film frames on the film roll loaded in the camera and generating a count signal indicating the count;
   a film existence detector coupled to said counter and responsive said count signal from said counter to detect whether the camera has the film roll loaded therein, wherein said film existence detector only determines whether film is loaded in the camera when said count signal is "0"; and
   a film travel detector selectively controlling film advance or film rewinding by detecting a film travel pulse output every time the film roll travels by a predetermined length and applying a film stop signal to said film transporter when the number of said travel pulses has reached a predetermined number;
   wherein said film transporter is not actuated when said film existence detector indicates that the camera has no film roll loaded therein; and
   wherein said predetermined length is dependent on whether said count signal is "0" when the film roll is loaded in the camera.

4. The film transporting system according to claim, 3, wherein said film travel detector detects, within a predetermined period after the film roll has started to travel, whether the number of film travel pulses has reached said predetermined number or not.

5. Film transporting system according to claim 4, wherein a film travel pulse is detected by said film travel detector within a predetermined period and said predetermined period is set each time a travel pulse is output.

6. Film transporting system according to claim 4, wherein operation of said counter is started by closure of a rear cover or depression of a release button.

7. The film transporting system according to claim 3, wherein the film travel pulse is detected by said film travel detector means within a predetermined period and said predetermined period is set every time each travel pulse is output.

8. Film transporting system according to claim 7, wherein operation of said counter is started by closure of a rear cover or depression of a release button.

9. Film transporting system according to claim 3, wherein operation of said counter is started by closure of a rear cover or depression of a release button.

10. A film transporting system for a photographic camera, said film transporting system comprising:
- a film transporter selectively functioning to advance or rewind a film roll loaded in the camera;
- a counter counting the number of used film frames and generating a count signal; and
- a film existence detector coupled to said counter, said film existence detector responsive to said count signal applied from said counter for selectively detecting whether the camera has the film roll loaded therein, wherein said film existence detector only determines the presence of the film roll if said count signal is less than a predetermined number; and
- a control system coupled to said film existence detector for controlling operation of said film transporter such that initial film advance and advance of each film frame following said initial film advance is provided by said transporter if said film existence detector indicates that film is loaded in said camera.

11. Film transporting system according to claim 10, wherein said predetermined number is 1.

* * * * *

UNITED STATES PATENT AND TRADEMARK OFFICE
CERTIFICATE OF CORRECTION

PATENT NO. : 5,349,407
DATED : September 20, 1994
INVENTOR(S) : Tatsuo Saito et al.

It is certified that error appears in the above-indentified patent and that said Letters Patent is hereby corrected as shown below:

Column 2, line 11
"so loner" should be --so long--;

Column 3, line 64
"cedes" should be --codes--;

Column 5, line 66
After "required" insert --for--;

Column 6, line 4
After "for" insert --a--; and

Column 6, line 5
Before "film" insert --the--.

Signed and Sealed this

Fourth Day of April, 1995

Attest:

BRUCE LEHMAN

Attesting Officer

Commissioner of Patents and Trademarks